United States Patent [19]

Bono et al.

[11] Patent Number: 5,201,536

[45] Date of Patent: Apr. 13, 1993

[54] COMBINATION CARRIER CART/TABLE DEVICE

[75] Inventors: Julian M. Bono, Savannah, Ga.;
    Jonathan Hoffman, Flanders, N.J.

[73] Assignee: BSP Corporation, Savannah, Ga.

[21] Appl. No.: 588,233

[22] Filed: Sep. 26, 1990

[51] Int. Cl.⁵ .................................................. B62B 1/04
[52] U.S. Cl. ........................................ 280/30; 280/37;
                                          280/47.18; 280/47.24
[58] Field of Search .................... 280/37, 30, 639, 42,
           280/651, 652, 643, 47.17, 47.18, 47.24, 47.3

[56] References Cited

U.S. PATENT DOCUMENTS

| | | | |
|---|---|---|---|
| 2,730,372 | 1/1956 | Mahr | 280/30 |
| 2,792,270 | 5/1957 | Anderson | 200/30 |
| 3,386,749 | 1/1968 | Roudanez | 280/47.3 |
| 3,677,571 | 7/1972 | Mataro, Jr. et al. | 280/47.3 |
| 3,758,128 | 9/1973 | Stenwell | 280/47.3 |
| 4,087,102 | 5/1978 | Sprague | 280/37 |
| 4,228,877 | 10/1980 | Cotharg | 280/37 |
| 4,248,433 | 2/1981 | Stark | 280/47.17 |
| 4,272,222 | 1/1981 | Cassimally et al. | 280/37 |
| 4,284,286 | 8/1981 | Lewallen . | |
| 4,703,944 | 11/1987 | Higson | 280/47.18 |
| 4,815,761 | 3/1989 | Henderson et al. | 280/47.3 |

FOREIGN PATENT DOCUMENTS

| | | |
|---|---|---|
| 0412879 | 2/1990 | European Pat. Off. . |
| 2036021 | 7/1970 | Fed. Rep. of Germany . |
| 672192 | 9/1950 | United Kingdom . |
| 2216073 | 3/1988 | United Kingdom . |

*Primary Examiner*—Richard M. Camby
*Attorney, Agent, or Firm*—Caesar, Rivise, Bernstein, Cohen & Pokotilow, Ltd.

[57] ABSTRACT

A multi-purpose device which can be easily converted from a compact case to a carrying cart and to a table. The carrying cart and the table have triangular support systems which enable the devices to be highly stable and carry increased loads. A roller forming part of the device has three narrow areas for low rolling friction over hard surfaces with wider concave-shaped or escalloped areas between the narrow areas to preclude excessive sinking on soft surfaces (e.g., beaches, dirt parking lots, grassy areas, snow etc). The device includes carrying space and a frame, which is used in the table arrangement, for attaching a trashbag liner to hold trash during and after the conclusion of a picnic, a day at the beach, etc.

30 Claims, 4 Drawing Sheets

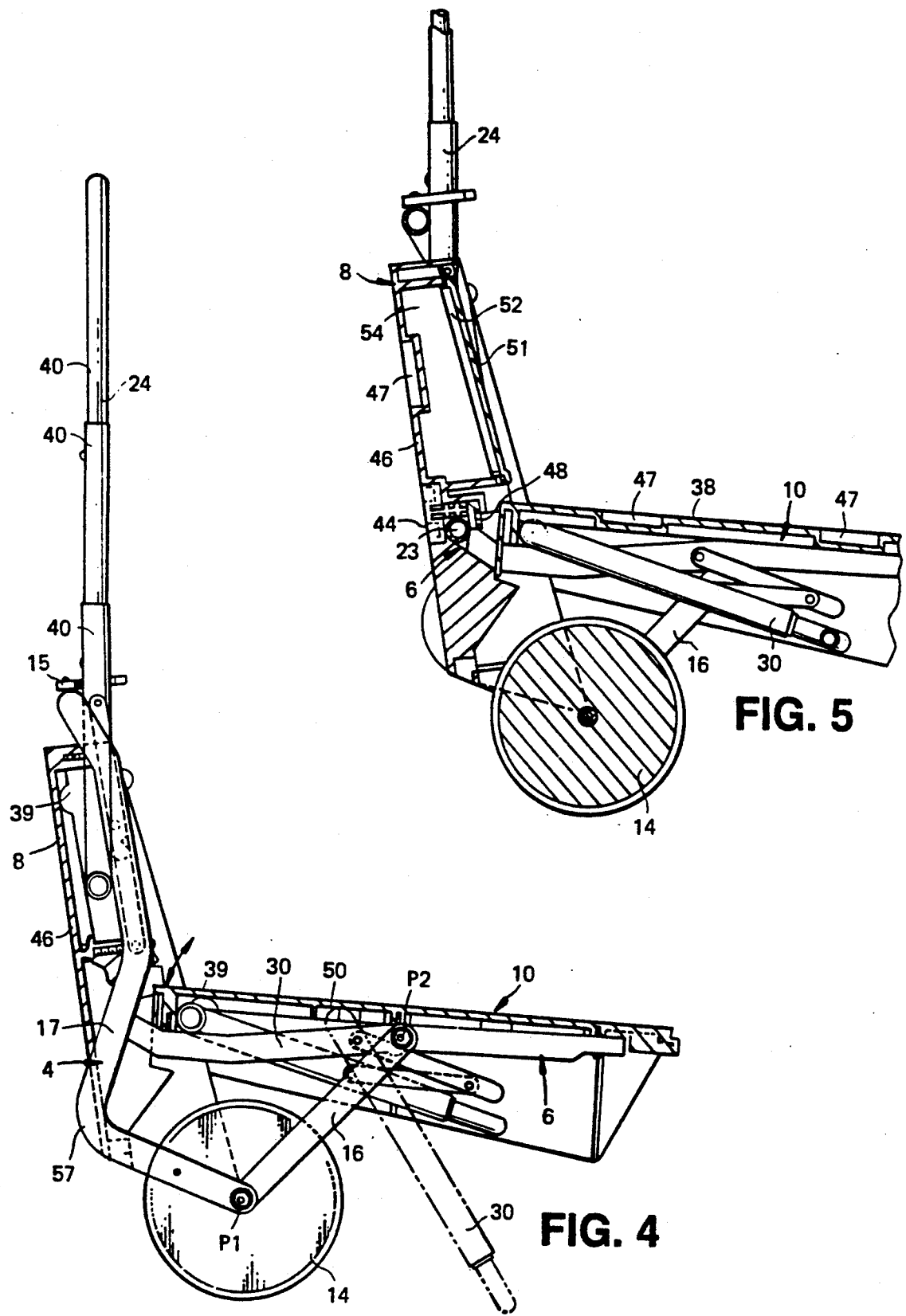

COMBINATION CARRIER CART/TABLE DEVICE

BACKGROUND OF THE INVENTION

The invention relates generally to folding types of carts and tables, and more particularly to a multi-purpose combination carrier cart/table device which folds into a compact case for carrying or storage.

Many folding or collapsible types of tables and carts are known. M. E. Rudy, U.S. Pat. No. 1,317,895, discloses a combined folding table and lunch box. W. W. Block, U.S. Pat. No. 2,903,313; R. B. Karoff, U.S. Pat. No. 2,868,598; J. G. Hansen U.S. Pat. No. 3,162,149 and B. Anderson U.S. Pat. No. 2,792,270 all show folding types of tables. Folding ironing boards are disclosed by J. J. Toth, U.S. Pat. No. 2,675,635 and J. E. Wood, U.S. Pat. No. 2,885,803.

In addition, Maturo, Jr. et al., U.S. Pat. No. 3,677,571, discloses a collapsible beach cart having an elongated roller 54 and Stenwall U.S. Pat. No. 3,758,128 discloses a combined beach chair and shopping cart with rollers 18 and 24.

Of general interest are Howe, U.S. Pat. No. 3,242,871; Alch, U.S. Pat. No. 2,545,064; Rahal, U.S. Pat. No. 2,837,394; Schoeppner, U.S. Pat. No. 2,805,707; Caldwell, U.S. Pat. No. 3,547,054; Kuchinsky, Jr., U.S. Pat. No. 4,659,142 (see pair of rollers 18); Roudanez U S. Pat. No. 3,386,749 (see wheels 10 and 18); Dickerson, U.S. Pat. No. 4,543,774 (see spherical rollers 21 and 22); Hicks et al., U.S. Pat. No. 4,362,308 (see roller assembly 142); and Rock, U.S. Pat. No. 3,679,227 (see rollers 16 and 17).

OBJECTS OF THE INVENTION

It is a general object of the instant invention to provide a multi-purpose device which has greater flexibility than the prior art devices.

It is a further object of the instant invention to provide a multi-purpose device which can be arranged to form a compact carrying case, a table and a carrying cart.

It is still a further object of the instant invention to provide a multi-purpose device which can be arranged to form a table which can be varied in height.

It is yet still a further object of the instant invention to provide a multi-purpose device which can be arranged to form a carrying cart with a roller which provides minimal rolling friction on hard surfaces and prevents sinking into soft surfaces.

It is another object of the instant invention to provide a carrying cart with a triangular type of support system for increased load bearing capability.

It is still another object of the instant invention to provide a table with a triangular support system which allows for increased load bearing capability and stability.

It is yet still another object of the instant invention to provide a compact carrying case with a compartment for carrying and storing clothing and other objects.

It is an additional object of the instant invention to provide a multi-purpose device which is easy and inexpensive to manufacture.

It is still an additional object of the instant invention to provide a multi-purpose device which can be arranged to form a table with a frame for holding trashcan liners.

It is yet still an additional object of the instant invention to provide a multi-purpose device which is selfcontained and requires no additional parts or tools to operate.

SUMMARY OF THE INVENTION

This invention comprises two body sections with a frame attached to each of the body sections and a roller or wheel. The body sections may be abutted to each other to form a compact case with parts of the frames being the handles of the case. The sections may also be abutted end to end to form a table top. Collapsible legs stored within the section can then be extended to form a table. The legs comprise telescoping elements which allow for varying the height of the table.

The handle end of one body section can be rotated about a double pivot and locked into the other body section to form a carrying cart with the roller beneath the junction of the body sections. Thus, the top surface of one section forms a load bearing surface for the carrying of articles while the inside surface of the other section forms the back of the cart. One of the extendable legs can then be extended upward to form a handle for pushing or pulling the cart, and the other extendable leg may be extended downward to form a kick stand for the cart.

The frame elements, and therefore the body sections, are pivoted to the axle of the roller and are rotated about that pivot to form the compact case, the table and the carrying cart. One frame is directly connected to the pivot while the other frame is double pivoted. That is, the other frame is pivoted to one end of a strut while the other end of the strut is pivoted to the axle of the roller. Thus, when the device is arranged as a cart, the loading surface is supported by a triangular arrangement which includes one frame element, the strut, and the other frame element. This enables the cart to bear a heavier load than would normally be the case if the loading surface were cantilevered.

The table also is supported by a triangular structure which includes the table tops, ends to the body sections, and the pivot points. When the table is set up, load on the table tends to increase the pressure which pushes the body sections together rather than tending to separate the body sections, as in a number of existing devices.

DESCRIPTION OF THE DRAWING

Other objects and many of the intended advantages of this invention will be readily appreciated as the same becomes better understood by reference to the following detailed description when considered in connection with the accompanying drawing, wherein:

FIG. 4 is a cross-sectional view of the carrying cart arrangement of the instant invention taken along the line 4—4 of FIG. 3.

FIG. 5 is a cross-sectional view of the carrying cart arrangement of the instant invention taken along the line 5—5 of FIG. 3.

DETAILED DESCRIPTION OF THE PREFERRED EMBODIMENT

Figure 1:
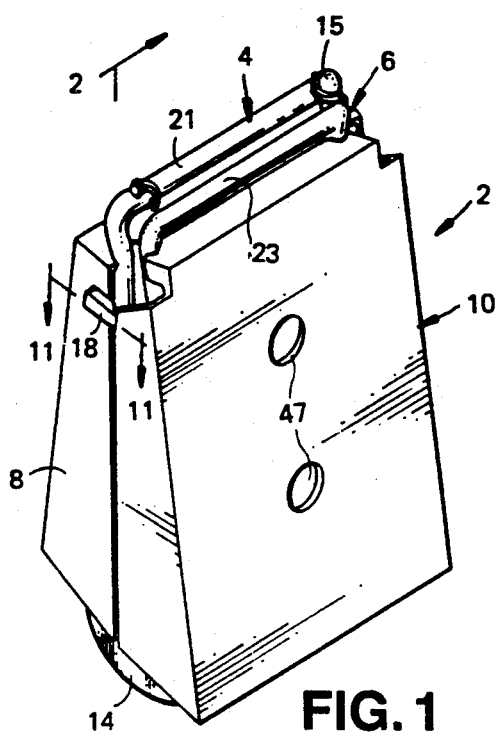
FIG. 1 is an isometric view of the carrying case arrangement of the instant invention.
Figure 2:
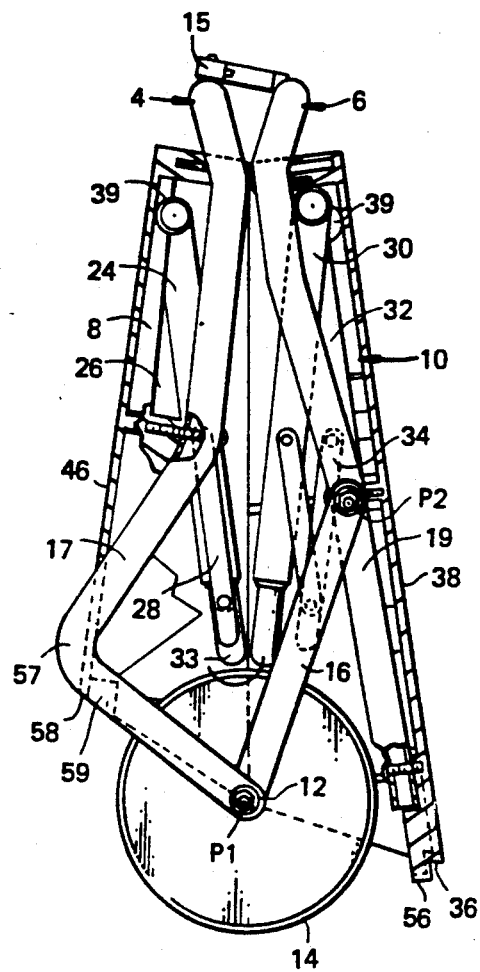
FIG. 2 is a cross-sectional view of the carrying case arrangement of the instant invention taken along the line 2—2 of FIG. 1.

Referring now in greater detail to the figures of the drawing, wherein like reference characters refer to like parts, the carrying case arrangement of the device 2 embodying the present invention is shown in FIGS. 1 and 2. Specifically, the device 2 includes frame members 4 and 6 which are bolted to body sections 8 and 10 respectively. As can be seen in FIG. 2 frame member 4 is pivotally connected to axle 12 of roller 14. The frame member 6 is doubled pivoted, being pivotally connected to one end of strut 16 with the other end of the strut 16 being pivotally connected to the pivot at the axle 12 of the roller 14. The purpose of providing a double pivoting arrangement for frame member 6 will be explained in detail hereinafter.

At this point it should be noted that the frame members 4 and 6 are generally U-shaped, each having two legs 17 and 19 respectively. Legs 17 of frame member 4 are connected at one end by connecting section 21 and legs 19 of the frame member are connected at one end by connecting section 23. The connecting sections 21 and 23 form the handles of the carrying case, as shown in FIG. 1. One leg 17 of the frame member 4 is pivotally connected to one side of the roller 14 at the axle 12 while the other leg 17 of the frame member 4 is pivotally connected to the other side of the roller 14 at the axle 12. Similarly, there are two struts 16, with one strut being connected to one of the legs 19 of the frame member 6 and to one side of the wheel 14 at the axle 12 while the other strut 16 is connected to the other of the legs 19 of the frame member 6 and to the other side of roller 14 at the axle 12.

Figure 11:
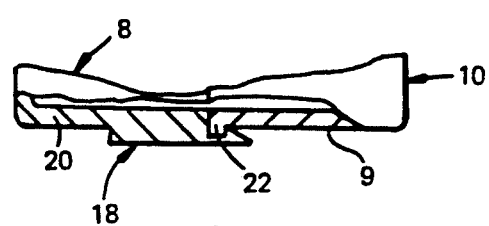
FIG. 11 is a sectional view of the mechanism which locks together the body sections of the device for the compact case arrangement of the instant invention taken along the line 11—11 of FIG. 1.

When the frame members 4 and 6 are rotated about their pivotal connections at the axle 12 to cause the body sections 8 and 10 to abut each other, as shown in FIG. 1, the body sections 8 and 10 are secured by locking mechanism 18. A cross-sectional view of the locking mechanism is shown in FIG. 11. Hasp 20 of the locking mechanism 18, is attached to the body section 8. It captures ridge 22 of the locking element 9 attached to the body member 10. A standard locking mechanism as used for luggage also may be employed.

Referring again to FIG. 2 an extendable leg assembly 24 is shown contracted and stored within the body section 8. One end of the leg assembly 24 is free to move within channel 26. The extendable leg assembly 24 is connected to the frame member 4 by a hinge 28. Similarly, an extendable leg assembly 30 is shown contracted and placed within the body section 10. One end of the extendable leg assembly 30 is free to move within the channel 32. It is connected to the frame member 6 by hinge 34.

The extendable leg assemblies 24 and 30 are U-shaped, each having two legs 25 and 27 respectively, which are connected by connecting sections 42 and 58 respectively (see FIG. 6) at their proximal ends 33, as will be described in detail later. As stated previously the frame members 4 and 6 also have two legs 17 and 19 which are connected at one of their ends by the connecting sections 21 and 23. Therefore, there are two hinges 28, one connecting one of the legs 25 of the extendable leg assembly 24 to an associated leg 17 of the frame member 4 and the other hinge 28 connecting the other one of the legs 25 of the extendable leg assembly 24 to the other leg 17 of the frame member 4. Similarly, there are two hinges 34 which connect each of the legs 27 of the extendable leg assembly 30 to its associated leg 19 of the frame member 6. The operation of the extendable leg assemblies 24 and 30 will be explained in detail later.

Figure 3:
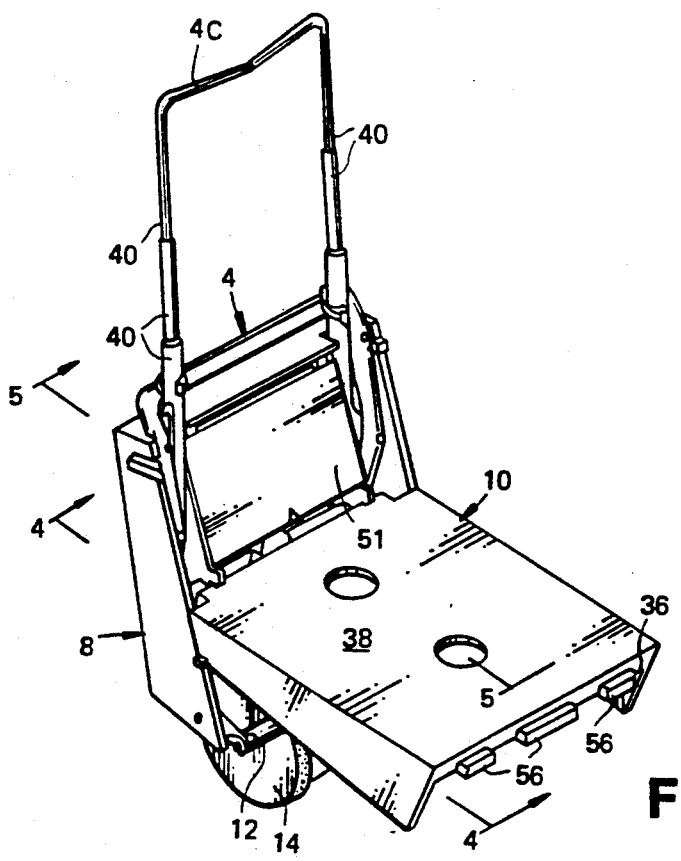
FIG. 3 is an isometric view of the carrying cart arrangement of the instant invention.

The carrying cart arrangement of the device 2, which is shown isometrically in FIG. 3, will now be described. Referring again to FIG. 2, when the distal end 36 of the body member 10 is moved away from the wheel 14, the body member 10 is rotated about the pivot at one end of the strut 16, and the other end of the strut 16 is rotated about the axle 12 Thus, the outer surface 38 of the body section 10 assumes an approximately horizontal position as shown in FIG. 3, and in the cross-sectional views of the carrying cart shown in FIGS. 4 and 5. The outer surface 38 of the body section 10 becomes the load bearing surface of the carrying cart. At the same time, the end of the extendable leg assembly 24 which is in the channel 26 of the body section 8 is moved from the detent 39 of the channel 26 and the extendable leg assembly 24 is rotated upward to serve as the handle for the carrying cart as shown in FIG. 3. When the telescoping elements 40 of the extendable leg assembly 24 are extended, the connecting section 42 provides a handle for pushing or pulling the cart at a height convenient to the user.

Referring now to FIGS. 4 and 5, the body section 10 is locked in position by a rotating locking knob 44, which is mounted in a recess in the outer surface 46 of the body section 8. The locking knob 44 is rotated to turn a locking tab 48, which captures the connecting section 23 of the frame member 6 and locks it into position.

Also, the end of the extendable leg assembly 30 positioned in the channel 32 may be moved into detent 50 of channel 32 and the leg assembly 30 rotated clockwise to form a kickstand for the carrying cart as shown by the dashed lines in FIG. 4.

As shown in FIGS. 4 and 5, the triangular arrangement which includes the struts 16, the frame member 4, the frame member 6, the axle 12 and the outer surface 38 of the carrying cart provides strength and stability which increases the load carrying capacity of the carrying cart.

Figure 12:
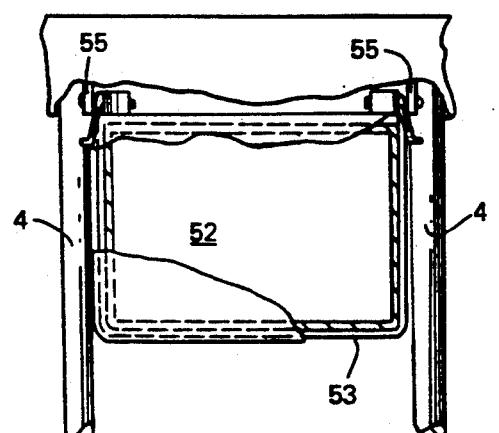
FIG. 12 is a sectional view of the hinged panel located in one of body sections.

The inner surface 51 (see FIG. 5) of the body member 8 comprises a hinged panel 52 which is connected at pivots 55 to the legs 17 of the frame member 4. The hinged panel 52 allows access to a storage compartment 54 for the storing or transporting of clothing or other sundry items. A U-shaped frame 53, for holding trashcan liners, is also pivotally connected to the legs 17 at the pivots 55. FIG. 12 shows a sectional view of the hinged panel 52 and the frame 53.

Another aspect of the carrying cart is the fact that, as seen in FIG. 4, the legs 17 of the frame member 4 are bent at a dogleg 57 to allow for freedom in movement of the body section 8 for the various arrangements of the device 2. However, the legs 19 of the frame member 6 are generally straight. This dogleg 57 also provides a bumper which protects the carrying cart, particularly the body sections 8 and 10, when the cart is rolled off and onto curbs or stairs.

Figure 6:
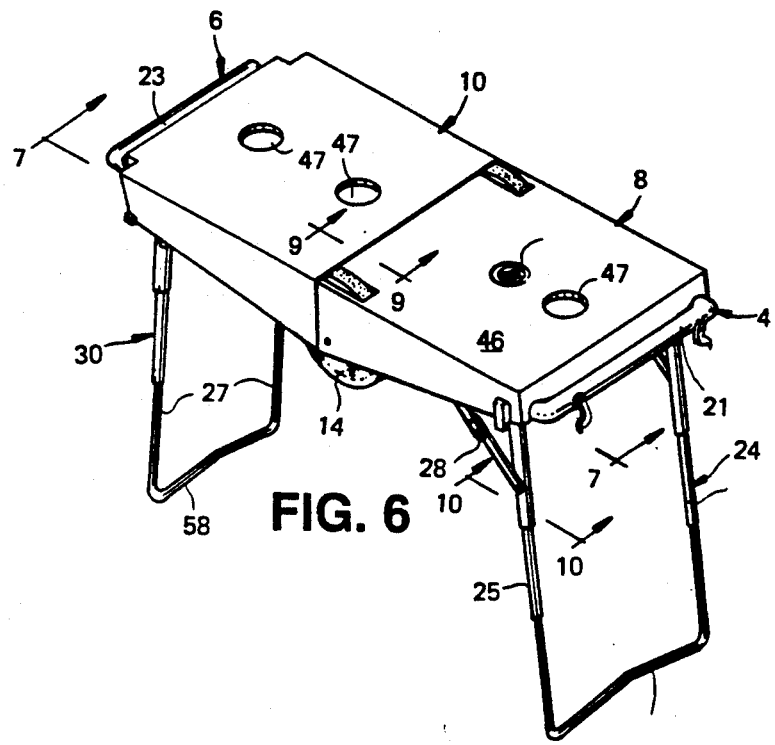
FIG. 6 is an isometric view of the table arrangement of the instant invention.

FIG. 6 shows an isometric view of the table. The arrangement of the device 2 into the table configuration will be explained with reference to FIG. 2. The frame member 6 is rotated clockwise, which also causes the struts 16 to rotate clockwise, so that the distal end 36 of the body section 10 goes around and under the wheel 14 until it abuts the distal end 58 of the body member 8. Thus a single flat surface is formed comprising the outer surfaces 38 and 46 of the body members 10 and 8 respectively. Indentations 47 in the outer surfaces 38 and 46 are for the placement of drinking cups. Although the dog legs 57 extend slightly above the plane of the surfaces 38 and 46, they do not unduly interfere with the use of the table top. It also should be noted from FIGS. 3 and 4 that the distal end 36 of the body section 10 includes projections 56 which nest into recesses 59 of the body section 8 to form a tight fit (see FIG. 9).

Figure 7:
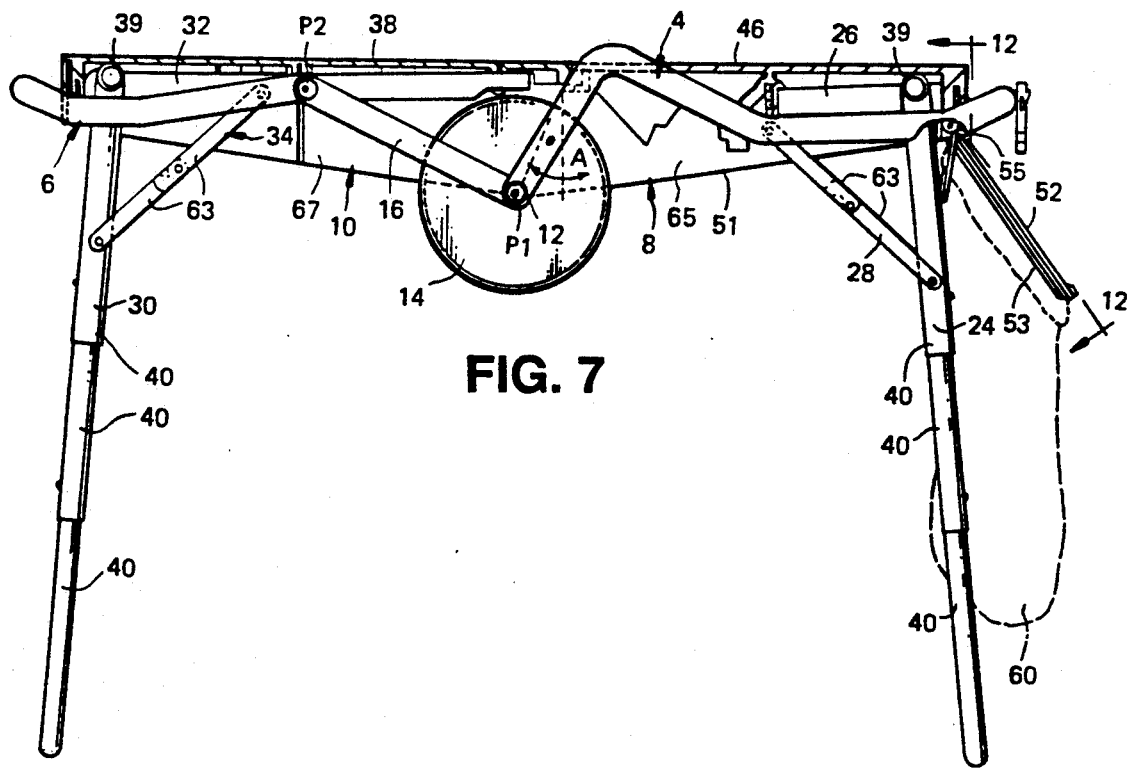
FIG. 7 is a cross-sectional view of the table arrangement of the instant invention taken along the line 7—7 of FIG. 6.
Figure 10:
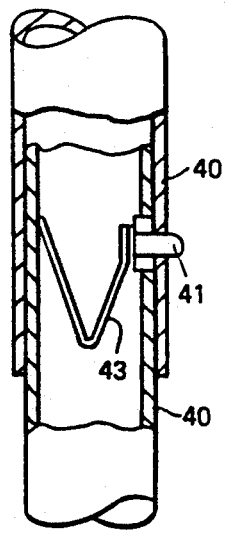
FIG. 10 is a sectional view of the locking pin of the telescoping extendable legs of the table arrangement of the instant invention taken along the line 10—10 of FIG. 6.

Referring now to FIG. 7, which is a sectional side elevation view of the table taken along the lines 7—7 of FIG. 6, it can be seen that one end of the extendable leg assemblies 24 and 30 has been placed into the detents 39 of the channels 26 and 32 respectively. The legs have been extended by extending their telescoping elements 40, and the legs have been locked into position by extending the links 63 of the hinges 28 and 34 in a known manner. The telescoping elements 40 are locked into position by locking pin 41 which is spring loaded by spring 43 as shown in FIG. 10.

The triangular supporting arrangement comprising the body sections 8 and 10, the frame members 4 and 6, and the axle 12 provide strength and stability to the table. In fact, as load is added to the table surfaces 38 and 46, additional pressure is provided in a direction which forces the body sections 8 and 10 into tighter abutment with each other.

It should also be noted that the sides 65 and 67 of the body sections 8 and 10 respectively do not abut in a plane perpendicular to the table top formed by the surfaces 38 and 46, but rather at an angle A to the perpendicular. Thus, when load is placed on the table top, the body sections are forced into tighter wedging abutment. Further stability is provided because of the substantial contact surface with the ground provided by connecting sections 42 and 58 of the leg assemblies 24 and 30 (see FIG. 6). The connecting section 42 and 58 are angled upward. This provides two stable contact points at the ends of each connecting section to prevent rocking on uneven surfaces, with the length of the sections preventing sinking into soft surfaces.

As can be further seen from FIG. 7, hinged panel 52 on the inner surface 51 has been opened and extended. Trashcan liner 60 is wrapped around the frame 53 associated with the hinged panel 52, to hold trash or waste material during parties or picnics when the table is used. Hinged panel 52 also functions as a lid for the liner 60.

Figure 8:
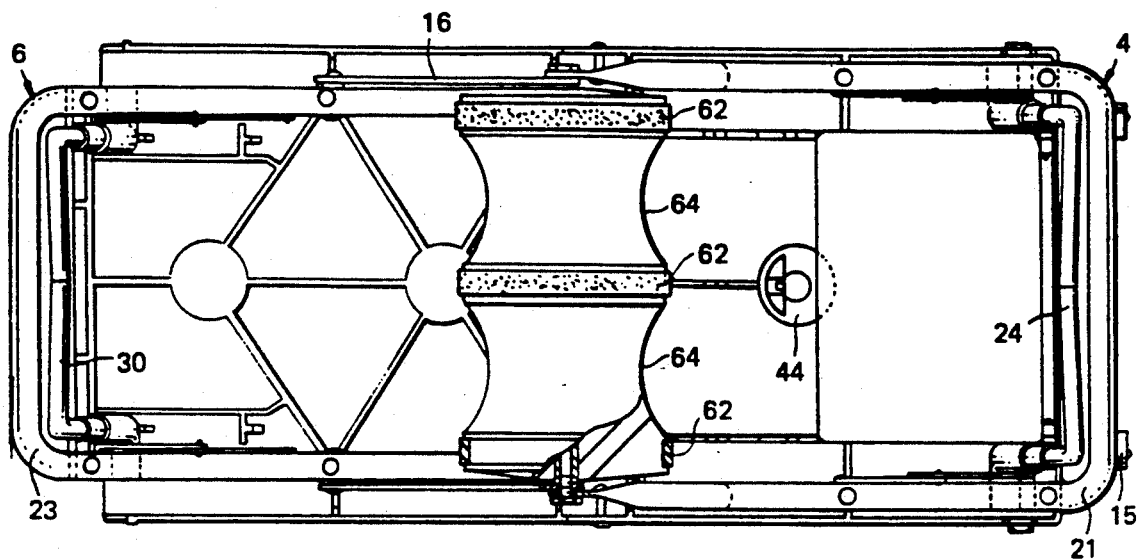
FIG. 8 is a bottom plan view, partially in section, of the table arrangement of the instant invention.

FIG. 8, a bottom plan view of the table, shows the roller 14 in further detail. As can be seen, the roller 14 comprises a cylindrical form with three narrow segments 62 upon which treads or rough material are placed, and with two concave wider segments 64 between the narrow segments 62. Thus, the roller 14 can traverse hardened surfaces with minimal friction because the roller only makes contact with the larger diameter narrow segments. At the same time, the roller, because of its unique design, prevents the device 2, when the device is used as a cart, from sinking into soft surfaces such as sand, dirt or snow when the wider concave sections 64 of the roller 14 make contact with such surfaces.

Figure 9:
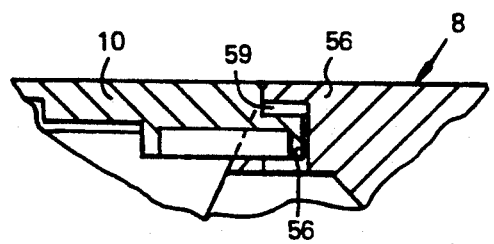
FIG. 9 is a cross-sectional view of the junction of the sections forming the table top of the table arrangement of the instant invention taken along the line 9—9 if FIG. 6.

FIG. 9 is a sectional view of the abutment of the body sections 8 and 10 taken along the line 9—9 of FIG. 2. It shows the interlocking of the projections 56 of the body section 10 into recesses 59 of the body section 8.

In the preferred embodiment the extendable leg assemblies and the frame members are made of aluminum or any other suitable metal. The body sections are fabricated from injection molded plastic material such as LDPE structural foam.

A multi-purpose device 2 which can perform several functions has been described. For example, if a family wishes to spend a day at the beach, the device 2 may be carried as a compact carrying case in a car. Upon arrival at the beach the device 2 can be easily converted from a compact case to a carrying cart and loaded with food, clothing and sundry items as desired. The loaded carrying cart can be wheeled onto the beach with the wide concave roller sections 64 preventing the cart from sinking into the sand. Upon arrival at the desired position on the beach, the family can unload the carrying cart and convert the carrying cart into a table for card or board game playing or for consumption of potables and foods. The triangular support systems make both the cart and the table sturdy and enable the carrying of heavy loads by both the cart and the table.

Similarly, a family wishing to spend the day at the park having a picnic can also use the multi-purpose device to convert in turn from a compact case to a carrying cart and thence to a table for having a picnic. Again the structure of the roller 14 enables easy movement with minimal friction of the carrying cart by providing narrow contact surface for rolling over hard surfaces and a greater contact surface for improved traction over soft surfaces by preventing the cart from sinking into the soft surfaces.

Without further elaboration, the foregoing will so fully illustrate my invention that others may, by applying current or future knowledge, adapt the same for use under various conditions of service.

What is claimed is:

1. A combination carrier/table device comprising a first and second body section, each of said body sections including a compartment having a base wall and a pair of sidewalls extending from said base wall, said sidewalls terminating at distal edges; a pivot about which said body sections can be rotated; a roller connected to said body sections; a means for arranging said body sections in a first predetermined orientation in which the distal edges of said pair of sidewalls of said first body section are adjacent the distal edges of said pair of sidewalls of said second body section to form a compact case for carrying or storage, said compact case having an interior compartment provided by said base walls and said sidewalls of said body sections; a means for arranging said body sections in a second predetermined orientation to form a table including the base walls of the body sections as the top thereof, said body sections including leg means connected thereto for supporting the table on a supporting surface with the roller out of engagement with said supporting surface; and a means for arranging said body sections in a third predetermined orientation in which said body sections form lower and rear sections of a carrying cart, supported for movement on said supporting surface by said roller, said means for arranging said body sections in each of said first, second and third predetermined orientations including portions located within the interior compartment provided by the body sections when said body sections are in said first predetermined orientation, said first, second and third predetermined orientations each being different from the other of said predetermined orientations.

2. The device of claim 1 further comprising a first frame member connected to said first body section and a second frame member connected to said second body section and said means for arranging said body sections in said first predetermined orientation to form a compact case comprising said frame members, said pivot, and at least one strut pivotally connected to said second frame member.

3. A combination carrier/table device comprising a first and second body section; a pivot about which said body sections can be rotated; a roller connected to said body sections; a means for arranging said body sections in a first predetermined orientation in which said sections form a compact case for carrying or storage; a means for arranging said body sections in a second predetermined orientation to form a table including the body sections as the top thereof; and a means for arranging said body sections in a third predetermined orientation in which said body sections form lower and rear sections of a carrying cart, supported for movement on said roller, said means for arranging said body sections in said first predetermined orientation including a first frame member connected to said first body second and a second frame member connected to said second body section, connecting section therebetween, said frame members have proximal and distal ends with said proximal ends comprising said connecting sections and said distal ends comprising the free ends of said legs, and wherein said distal ends of the legs of said first frame member are connected to said pivot, and one end of each of said at least one strut being pivotally connected to a corresponding one of said legs of said second frame member and the other end of each of said at least one strut being connected to said pivot, so that when said first frame member is rotated about said pivot in one direction and said second frame member is rotated about said pivot in an opposite direction, said body sections abut each other and said connecting section of said first frame member abuts said connecting section of said second frame member to form the compact case with said connecting sections forming the handles of said carrying case.

4. The device of claim 3 wherein said first body section comprises a hasp and said second body section comprises a locking element for locking said sections together when said compact case has been formed.

5. A combination carrier/table device comprising a first and second body section; a pivot about which said body sections can be rotated; a roller connected to said body sections; a means for arranging said body sections in a first predetermined orientation in which said sections form a compact case for carrying or storage; a means for arranging said body sections in a second predetermined orientation to form a table including the body sections as the top thereof; and a means for arranging said body sections in a third predetermined orientation in which said sections form lower and rear sections of a carrying cart, supported for movement on said rollers, wherein said device comprises a first frame member connected to said fist body section and a second frame member connected to said second body section and at least one strut pivotally connected to said second frame member and wherein each of said body sections comprises a proximal end and a distal end and an outer and an inner surface, said device further comprising a first extendable leg assembly connected adjacent said proximal end of said first body section, and a second extendable leg assembly connected adjacent said proximal end of said second body section, and said means for arranging said body sections to form a table comprising said frame members, said body sections, said extendable leg assemblies, said at least one strut and said pivot, so that when said frame members are rotated about said pivot in opposite directions to cause said distal ends of said body sections to abut and said extendable leg assemblies are extended, said outer surfaces comprise a table top, and a table is formed.

6. The device of claim 5 wherein said extendable leg assemblies comprise telescoping elements to set and to vary the height of said table.

7. The device of claim 6 wherein said each of said extendable leg assemblies is U-shaped, having two extendable legs with a connecting members therebetween and when said telescoping elements are extended to form said table, said table rests upon said connecting members.

8. The device of claim 7 including hinges which connect each of said extendable legs of said first extendable leg assembly to each of said legs of said first frame member and hinges which connect each of extendable legs of said second extendable leg assembly to each of said legs of second frame member.

9. The device of claim 8 wherein said first and said second body sections comprise channels, each of said channels having a detent adjacent said proximal ends of said sections, and wherein said extendable legs have distal ends which ride in said channels, so that when said distal ends of said extendable legs are positioned into said detents and said hinges are extended, said legs are locked into a position perpendicular to the plane of said outer surfaces of said sections which form the table top.

10. The device of claim 9 wherein the distal end of said first body section comprises recesses and the distal end of said second body section comprises projections, with each of said projections nesting in an associated one of said recesses when the distal ends of said body sections abut each other.

11. The device of claim 10 wherein the plane of the junction of the distal ends of said body sections when said distal ends abut is at an angle to the perpendicular to the plane of said table top.

12. The device of claim 11 wherein said roller comprises an axle and said pivot is located on said axle.

13. The device of claim 12 wherein said table top is supported by a triangular support system and said support system comprises said body sections, said frame members, said strut and said axle.

14. The device of claim 7 wherein said connecting section are angled toward the distal ends of said extendable legs to provide two stable contact points at the ends of said connecting sections.

15. A combination carrier/table device comprising a first and second body section; a pivot about which said body sections can be rotated; a roller connected to said body sections; a means for arranging said body sections in a first predetermined orientation in which said sections form a compact case for carrying or storage; a means for arranging said body sections in a second predetermined orientation to form a table including the body sections as the top thereof; and a means for arranging said body sections in a third predetermined orientation in which said sections form lower and rear sections of a carrying cart, supported for movement on said rollers, each of said body sections comprising a proximal end and a distal end and an outer and inner surface, said inner surface of said first body section comprising a channel therein, and further including a locking assembly comprising a rotatable locking knob and a locking tab, said locking assembly projecting through said first body section so that said locking tab is positioned in said channel.

16. The device of claim 15 further including a first frame member connected to said first body section and a second frame member connected to said second body section, said frame members being U-shaped with legs and a connecting section therebetween, and wherein said frame members have proximal and distal ends with said proximal ends comprising said connecting sections and said distal ends comprising the free ends of said legs, and wherein said distal ends of the legs of said first frame member are connected to said pivot and one end of each of at least one strut is pivotally connected to a corresponding one of said legs of said second frame member and the other end of said at least one strut is connected to said pivot.

17. The device of claim 16 wherein said means to arrange said device to form a carrying cart comprises said first and second body sections, said first and second frame members, said locking assembly, said pivot, said at least one strut, and said channel, said carrying cart being formed by rotating said second frame member about said at least-one strut and said pivot to place said connecting section of said second frame member into said channel of said first body section and by rotating said locking, knob to position said locking tab-to lock said connecting section of said second frame member into said channel whereupon the outer surface of said second body member provides a load bearing surface for said cart, and said inner surface of said first body section provides a backstop for objects carried on said cart.

18. The device of claim 17 further comprises a U-shaped first extendable leg assembly having two extendable legs with telescoping elements and a connecting section therebetween and wherein said first body section comprises second channels and a detent in each of said channels, and each of said legs has a distal end riding within a corresponding one of said second channels in said first body unit, so that when said distal ends are placed within said detents and said legs are extended, a handle to push or pull said carrying cart is formed.

19. The device of claim 18 wherein said device further comprises a U-shaped second extendable leg assembly having two second extendable legs with telescoping elements and a connecting section therebetween, and wherein said second body section comprises third channels with a second detent in each of said channels third and each of said second legs has a distal end riding within a corresponding one of said third channels, so that when said distal ends are placed within said second detents, and said legs are extended a kickstand is formed for said carrying cart.

20. The device of claim 19 wherein said roller comprises an axle and said pivot is located on said axle forming a triangular support system for said load bearing surface comprising said first frame member, said second frame member, said strut, and said axle.

21. The device of claim 20 wherein said first frame member comprises dog-legged sections, said dog-legged sections extending through said outer surface of said first body section and comprise a bumper which provides protection to said carrying cart when said cart is rolled off, or onto, curbs or other raised surfaces.

22. The device of claim 21 comprising a first surface means for reducing friction when said cart is rolled over hard surfaces and a second surface means for precluding excessive sinking of said roller into soft surfaces.

23. The device of claim 22 wherein said roller is cylindrically shaped and said first surface means comprises narrow sections and said second surface means comprises wider concave sections between said narrow sections.

24. The device of claim 23 wherein said roller comprises three narrow sections and two wider concave sections.

25. The device of claim 1 said roller is cylindrically shaped and said first surface means comprises narrow sections and said second surface means comprises wider concave sections between said narrow sections.

26. The device of claim 25 wherein said roller comprises three narrow sections and two wider concave sections.

27. A combination carrier/table device supportable on a supporting surface, comprising a first and second body section; a pivot about which said body sections can be rotated; a roller connected to said body sections; a means for arranging said body sections in a first orientation to form a compact case for carrying or storage; a means for arranging said body sections in a second orientation to form a table with the roller out of engagement with said supporting surface and with said body sections forming the table top and leg means independent of said roller, supporting said table top on said supporting surface; and a means for arrangement said body sections in a third orientation to form a carrying cart with the roller engaging said supporting surface, said roller comprising a first surface means for reducing friction when the supporting surface engaging the roller is a hard surface and a second surface means for precluding excessive sinking of said roller when the supporting surface engaging the roller is a soft surface.

28. The device of claim 27 wherein said roller is cylindrically shaped and said first surface means comprises narrow sections and said second surface means comprises wider, concave sections between said narrow sections.

29. The device of claim 28 wherein said roller comprises three narrow sections and two wider concave sections.

30. A combination carrier/table device supportable on a supporting surface, said device comprising a first and second body section; a pivot about which said body sections can be rotated; a roller connected to said body sections; a means for arranging said body sections in a first orientation to form a compact case for carrying or storage; a means for arranging said body sections in a second orientation to form a table wit the body sections providing the table top, said device, when in said second orientation, including leg means for supporting the table top on said supporting surface with the roller out of engagement with said supporting surface; and a means for arranging said body sections in a third orientation to form a carrying cart with the roller engaging said supporting surface.

* * * * *